US012584680B2

(12) United States Patent
Chhetri et al.

(10) Patent No.: US 12,584,680 B2
(45) Date of Patent: Mar. 24, 2026

(54) DOOR SUPPORT FEATURE OF A REFRIGERATION UNIT

(71) Applicant: Whirlpool Corporation, Benton Harbor, MI (US)

(72) Inventors: Doray Chhetri, Pune (IN); Jackson F. Karl, Stevensville, MI (US); Vishal S. Marathe, Pune (IN); Abhay Naik, Stevensville, MI (US); Ranjit P. Patil, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 349 days.

(21) Appl. No.: 17/810,727

(22) Filed: Jul. 5, 2022

(65) Prior Publication Data

US 2024/0011700 A1 Jan. 11, 2024

(51) Int. Cl.
*F25D 23/02* (2006.01)
*E05D 7/081* (2006.01)
*E05D 11/06* (2006.01)

(52) U.S. Cl.
CPC ........... *F25D 23/028* (2013.01); *E05D 7/081* (2013.01); *E05D 11/06* (2013.01); *E05Y 2900/31* (2013.01)

(58) Field of Classification Search
CPC .. F25D 25/02; F25D 23/028; F25D 2323/024; E05F 7/06; E05D 11/06; E05D 7/081; E05Y 2900/31; E05Y 2201/218; Y10S 292/71; Y10S 292/15; Y10T 292/1083; Y10T 292/394; Y10T 292/1061; Y10T 292/0934; Y10T 292/34; Y10T 292/086; Y10T 292/0891; Y10T 292/0863; Y10T 292/0864; Y10T 292/0886; E05B 65/0042; E05B 65/0014; E05C 19/18
(Continued)

(56) References Cited

U.S. PATENT DOCUMENTS 1,720,143 A 7/1929 O'Connor
3,437,365 A * 4/1969 Zadanoff ............... E05C 19/188 292/202
(Continued)

FOREIGN PATENT DOCUMENTS

KR 0113756 Y1 4/1998
KR 19980041653 U 9/1998
(Continued)

*Primary Examiner* — Hiwot E Tefera
(74) *Attorney, Agent, or Firm* — Price Heneveld LLP

(57) ABSTRACT

A refrigeration unit includes a cabinet, a door, and a door support feature positioned proximate to the lower side of the door. The door support feature is movable relative to the cabinet between a first position, wherein the door support feature supports the lower side of the door in the closed position of the door, and a second position, wherein the door support feature is in a spaced-relationship with the lower side of the door in the closed position of the door. The refrigeration unit further includes a toe kick panel operable between an assembled condition and a removed condition. In the assembled condition, the toe kick panel is assembled with the cabinet below the door, such that the toe kick panel conceals the door support feature. In the removed condition, the toe kick panel is removed from the cabinet, such that the door support feature is revealed.

16 Claims, 5 Drawing Sheets

(58) Field of Classification Search
USPC ............................................................ 49/380
See application file for complete search history.

(56) References Cited

U.S. PATENT DOCUMENTS

| | | | | | |
|---|---|---|---|---|---|
| 3,785,685 | A | * | 1/1974 | MacDonald | E05C 19/182 292/87 |
| 4,648,637 | A | * | 3/1987 | Walter | E05C 3/14 292/DIG. 71 |
| 4,932,224 | A | * | 6/1990 | Katterhenry | F25D 23/10 312/236 |
| 5,114,193 | A | * | 5/1992 | Nass | E05C 3/047 292/67 |
| 5,114,194 | A | * | 5/1992 | Toifl | E05C 19/18 292/DIG. 28 |
| 5,531,490 | A | * | 7/1996 | Parker | E05C 19/184 292/262 |
| 6,874,825 | B1 | * | 4/2005 | Rauner | E05C 5/02 292/61 |
| 9,534,838 | B2 | | 1/2017 | Kim et al. | |
| 10,018,405 | B2 | | 7/2018 | Abrahamson | |
| 2007/0227208 | A1 | | 10/2007 | Ostberg | |
| 2013/0228369 | A1 | * | 9/2013 | Yang | E05C 1/02 292/137 |
| 2014/0259958 | A1 | | 9/2014 | Rumble | |
| 2017/0219271 | A1 | * | 8/2017 | Abrahamson | E05C 7/00 |
| 2018/0371810 | A1 | * | 12/2018 | Howard | E05C 1/04 |

FOREIGN PATENT DOCUMENTS

| | | | | | |
|---|---|---|---|---|---|
| KR | 2001019697 | A | * | 3/2001 | E05D 15/02 |
| KR | 20010019697 | A | | 3/2001 | |
| KR | 20120072766 | A | | 7/2012 | |
| WO | 2012025396 | A2 | | 3/2012 | |
| WO | 2022010073 | A1 | | 1/2022 | |

* cited by examiner

DOOR SUPPORT FEATURE OF A REFRIGERATION UNIT

BACKGROUND OF THE DISCLOSURE

The present disclosure generally relates to a refrigeration unit. In particular, the present disclosure relates to a refrigeration unit that includes a door support feature.

SUMMARY OF THE DISCLOSURE

According to one aspect of the present disclosure, a refrigeration unit includes a cabinet that defines a compartment and a door pivotably coupled to the cabinet by a hinge and having a lower side. The door is operable to pivot between an open position and a closed position. In the open position of the door, access to the compartment is provided. The refrigeration unit also includes a door support feature positioned proximate to the lower side of the door and movable relative to the cabinet between a first position and a second position. In the first position, the door support feature is configured to support the lower side of the door in the closed position of the door. In the second position, the door support feature is in a spaced-relationship with the lower side of the door in the closed position of the door. The refrigeration unit further includes a toe kick panel operable between an assembled condition and a removed condition. In the assembled condition, the toe kick panel is assembled with the cabinet below the door, such that the toe kick panel conceals the door support feature. In the removed condition, the toe kick panel is removed from the cabinet, such that the door support feature is revealed.

According to another aspect of the present disclosure, a refrigeration unit includes a cabinet that defines a compartment and a door pivotably coupled to the cabinet by a hinge and having a lower side. The door is operable to pivot between an open position and a closed position. In the open position of the door, access to the compartment is provided. The refrigeration unit also includes a door support feature operably coupled to the cabinet and movable relative to the cabinet between a first position and a second position. In the first position, the door support feature is configured to support the lower side of the door in the closed position of the door and limit movement of the door toward the open position. In the second position, the door support feature is in a spaced-relationship with the lower side of the door in the closed position of the door and the door is operable to move to the open position.

According to yet another aspect of the present disclosure, a refrigeration unit includes a cabinet that defines a compartment and a door pivotably coupled to the cabinet by a hinge and having a lower side. The door is operable to pivot between an open position and a closed position. In the open position of the door, access to the compartment is provided. The refrigeration unit also includes a door support feature positioned proximate to the lower side of the door and movable relative to the cabinet between a first position and a second position. In the first position, the door support feature is configured to support the lower side of the door in the closed position of the door. In the second position, the door support feature is in a spaced-relationship with the lower side of the door in the closed position of the door. The door support feature is operable to remain in the second position irrespective of movement of the door between the open and closed positions.

These and other features, advantages, and objects of the present disclosure will be further understood and appreciated by those skilled in the art by reference to the following specification, claims, and appended drawings.

Figure 1:
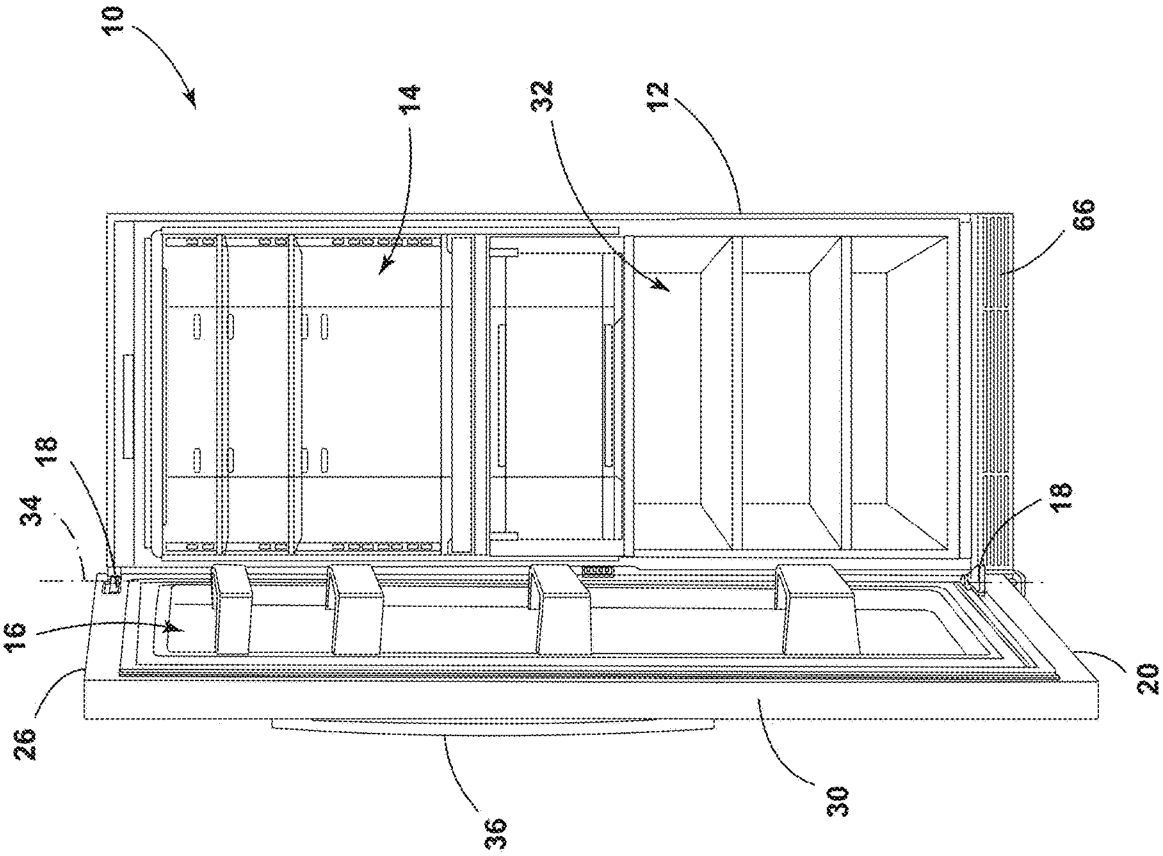
FIG. 1 is a front elevational view of a refrigeration unit illustrating a door in an open position, a compartment defined by a cabinet of the refrigeration unit, and a toe kick panel in an assembled condition.

The components in the figures are not necessarily to scale, emphasis instead being placed upon illustrating the principles described herein.

DETAILED DESCRIPTION

The present illustrated embodiments reside primarily in combinations of apparatus components related to a refrigeration unit. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 2:
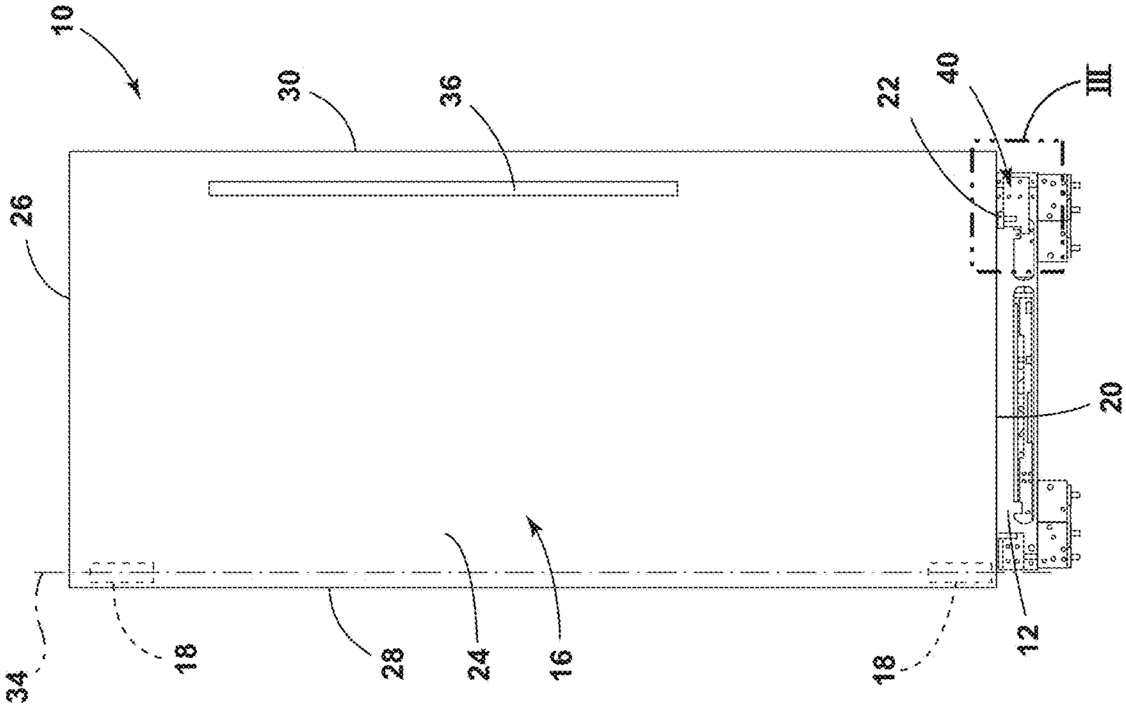
FIG. 2 is a front elevational view of a refrigeration unit illustrating a door in a closed position, and a door support feature coupled to a cabinet of the refrigeration unit.

For purposes of description herein, the terms "upper," "lower," "right," "left," "rear," "front," "vertical," "horizontal," and derivatives thereof shall relate to the disclosure as oriented in FIG. 2. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring now to FIGS. 1-8, reference numeral 10 generally designates a refrigeration unit. The refrigeration unit 10 includes a cabinet 12 that defines a compartment 14. A door 16 is pivotably coupled to the cabinet 12 by a hinge 18. The door 16 includes a lower side 20. The door 16 is operable to pivot between an open position, wherein access to the compartment 14 is provided, and a closed position. A door support feature 22 is positioned proximate to the lower side 20 of the door 16 and is movable relative to the cabinet 12 between a first position, wherein the door support feature 22 is configured to support the lower side 20 of the door 16 in the closed position of the door 16, and a second position, wherein the door support feature 22 is in a spaced-relationship with the lower side 20 of the door 16 in the closed position of the door 16. The door support feature 22 is operable to remain in the second position irrespective of movement of the door 16 between the open and closed positions.

Referring now to FIGS. 1 and 2, the refrigeration unit 10 includes the cabinet 12. The cabinet 12 can include a variety of components, in various embodiments. For example, the cabinet 12 may include an inner liner, an outer shell, and/or a variety of other components (e.g., brackets, feet, insulation, etc.). The cabinet 12 defines the compartment 14. In various embodiments, the cabinet 12 defines a plurality of compartments 14. For example, the cabinet 12 may define a refrigeration compartment and a freezer compartment.

Referring still to FIGS. 1 and 2, the refrigeration unit 10 includes the door 16. In various implementations, the refrigeration unit 10 can include a plurality of doors 16. For example, the refrigeration unit 10 can include a first door that corresponds with a refrigeration compartment of the refrigeration unit 10, and a second door that corresponds with a freezer compartment of the refrigeration unit 10. As illustrated in FIG. 2, the door 16 of the refrigeration unit 10 includes a front side 24, a lower side 20, an upper side 26 that is opposite the lower side 20, a first lateral side 28 that extends between the upper and lower sides 26, 20, and a second lateral side 30 that extends between the upper and lower sides 26, 20 opposite the first lateral side 28. In various embodiments, the front side 24 of the door 16 is adjacent to the upper, lower, first lateral, and second lateral sides 26, 20, 28, 30 of the door 16 and faces away from the compartment 14 defined by the cabinet 12 in the closed position of the door 16. In the embodiment illustrated in FIG. 2, the first lateral side 28 of the door 16 is a left side of the door 16, and the second lateral side 30 of the door 16 is a right side of the door 16. It is contemplated that the first lateral side 28 can be the right side of the door 16, and the second lateral side 30 can be the left side of the door 16, in some embodiments.

Referring still to FIGS. 1 and 2, the door 16 is pivotably coupled to the cabinet 12 by the hinge 18. In various implementations, the door 16 is pivotably coupled to the cabinet 12 by a plurality of hinges 18, as illustrated in FIGS. 1 and 2. The door 16 is operable to pivot, via the hinge 18, between the open position, wherein access to the compartment 14 of the refrigeration unit 10 is provided, as illustrated in FIG. 1, and the closed position, as illustrated in FIG. 2. In the closed position, the door 16 covers an opening 32 to the compartment 14. As illustrated in FIGS. 1 and 2, the door 16 pivots about a door pivot axis 34 between the open and closed positions. In various implementations, the door pivot axis 34 extends substantially vertically. As illustrated in FIGS. 1 and 2, the hinge 18 coupled to the door 16 is positioned proximate to the first lateral side 28 of the door 16. In some implementations, the first lateral side 28 of the door 16 is positioned nearer than the second lateral side 30 of the door 16 to the hinge 18.

Referring still to FIGS. 1 and 2, in some implementations, a handle 36 is coupled to the door 16. In the embodiment illustrated in FIG. 2, wherein the first lateral side 28 of the door 16 is positioned nearer than the second lateral side 30 of the door 16 to the hinge 18, the handle 36 is coupled to the front side 24 of the door 16 and positioned such that the second lateral side 30 of the door 16 is positioned nearer than the first lateral side 28 of the door 16 to the handle 36. In the illustrated embodiment, the handle 36 is elongated in a substantially vertical direction.

Referring now to FIGS. 1-8, the refrigeration unit 10 includes the door support feature 22. The door support feature 22 can be operably coupled to the cabinet 12. As illustrated in FIG. 2, in the closed position of the door 16, the door support feature 22 is positioned proximate to the lower side 20 of the door 16 of the refrigeration unit 10. In various embodiments, the door support feature 22 can be coupled to the cabinet 12, such that the door support feature 22 is positioned proximate to one of the first lateral side 28 of the door 16 and the second lateral side 30 of the door 16. For example, in the embodiment illustrated in FIG. 2, wherein the first lateral side 28 of the door 16 is nearer than the second lateral side 30 of the door 16 to the hinge 18, and the second lateral side 30 of the door 16 is nearer than the first lateral side 28 of the door 16 to the handle 36, the second lateral side 30 of the door 16 is nearer than the first lateral side 28 of the door 16 to the door support feature 22.

Figure 8:
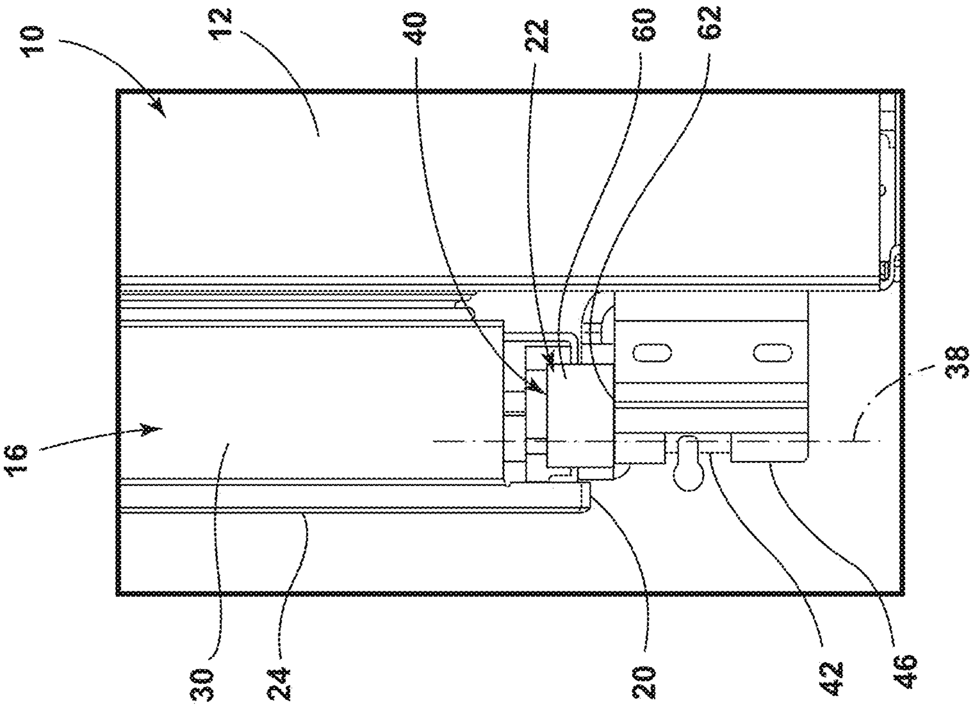
FIG. 8 is a side elevational view of a portion of a refrigeration unit illustrating a door support feature in a second position.

Referring still to FIGS. 1-8, the door support feature 22 is movable relative to the cabinet 12 between the first and second positions. In the first position of the door support feature 22, the door support feature 22 is configured to support the lower side 20 of the door 16 in the closed position of the door 16, as illustrated in FIGS. 2, 3, 6, and 7. In the second position of the door support feature 22, the door support feature 22 is in a spaced-relationship with the lower side 20 of the door 16, as illustrated in FIG. 8.

Figure 7:
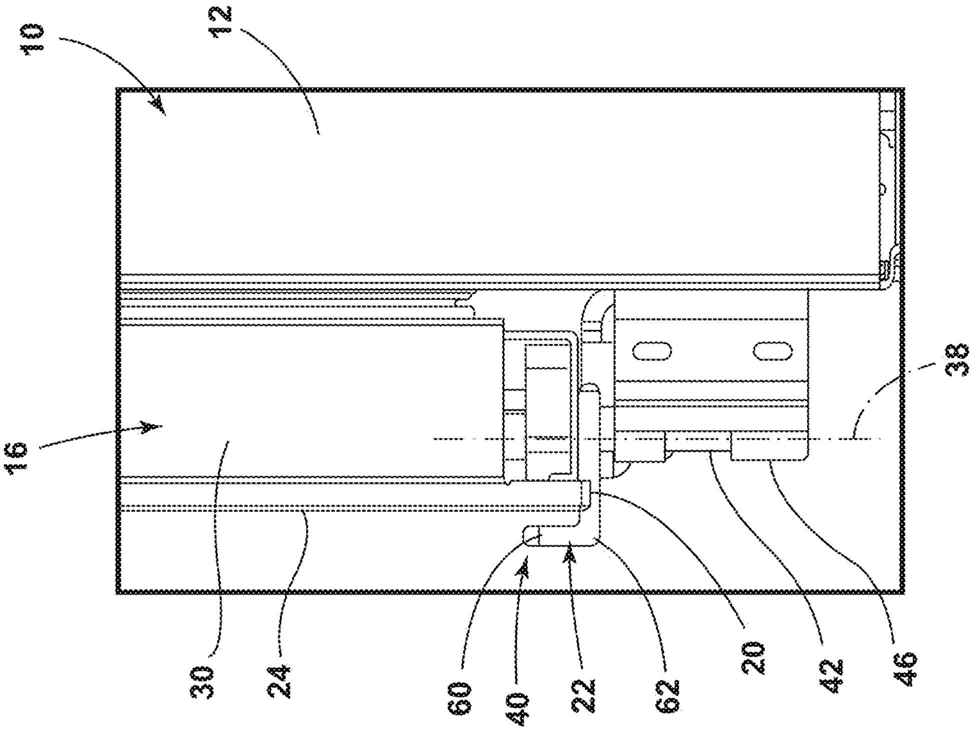
FIG. 7 is a side elevational view of a portion of a refrigeration unit illustrating a door support feature in a first position.

The door support feature 22 may be operable to move between the first and second positions in a variety of manners, in various implementations. For example, the door support feature 22 may translate, slide, deform, rotate, and/or pivot between the first and second positions. A variety of additional modes of movement are contemplated. In some implementations, the door support feature 22 is configured to pivot about a door support feature-pivot axis 38 between the first and second positions. In some embodiments, the door support feature-pivot axis 38 extends substantially parallel to the door pivot axis 34. For example, as illustrated in FIGS. 7 and 8, the door support feature-pivot axis 38 extends substantially vertically. In some implementations, the door support feature-pivot axis 38 extends substantially perpendicularly to the door pivot axis 34 about which the door 16 is operable to pivot between the open and closed positions. For example, in an exemplary embodiment, the door support feature-pivot axis 38 extends in a substantially forward-rearward horizontal direction that is perpendicular to the substantially vertical direction that the door pivot axis 34 extends.

Figure 6:
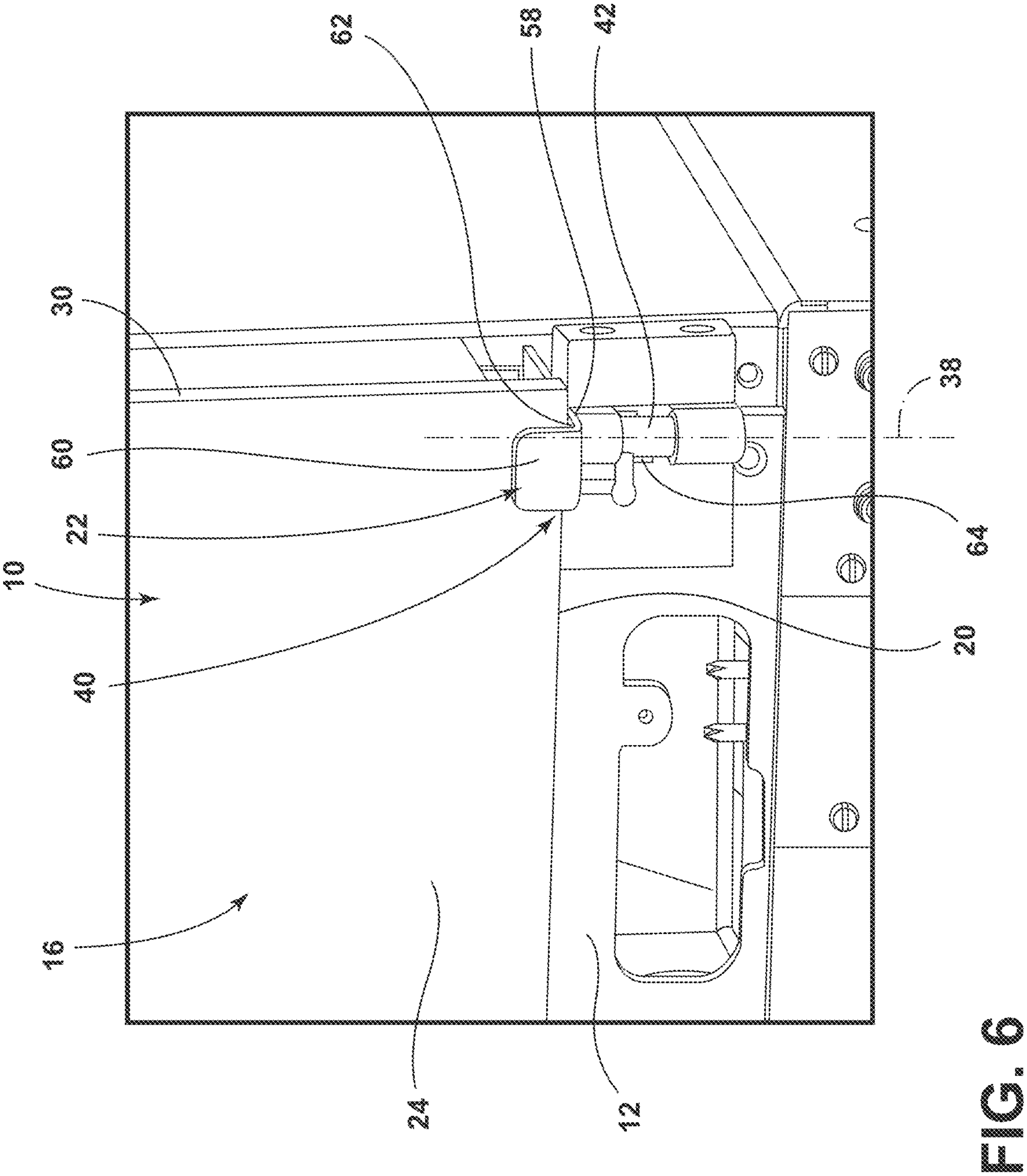
FIG. 6 is a top perspective view of a portion of a refrigeration unit illustrating a door support assembly that includes a bracket and a door support feature in a first position.

Referring now to FIGS. 6-8, in some implementations, in the first position of the door support feature 22, the door support feature 22 is configured to support the lower side 20 of the door 16 in the closed position of the door 16 and limit movement of the door 16 toward the open position. For example, as illustrated in FIGS. 6 and 7, a portion of the door support feature 22 extends upward along a portion of the front side 24 of the door 16 in the closed position of the door 16, as described further herein. In some embodiments, wherein the door support feature 22 is configured to limit movement of the door 16 toward the open position, the portion of the door support feature 22 that is configured to limit movement of the door 16 toward the open position is in a spaced-relationship with the front side 24 of the door 16 in the first position of the door support feature 22 when the door 16 is in the closed position, as illustrated in FIG. 7. In such embodiments, the door 16 may be operable to move toward the open position a first distance, before movement of the door 16 is limited by the door support feature 22 contacting the front side 24 of the door 16. In some implementations, the door support feature 22 limits movement of the door 16 toward the open position, such that the door 16 is generally prevented from exiting the closed position.

Figure 3:
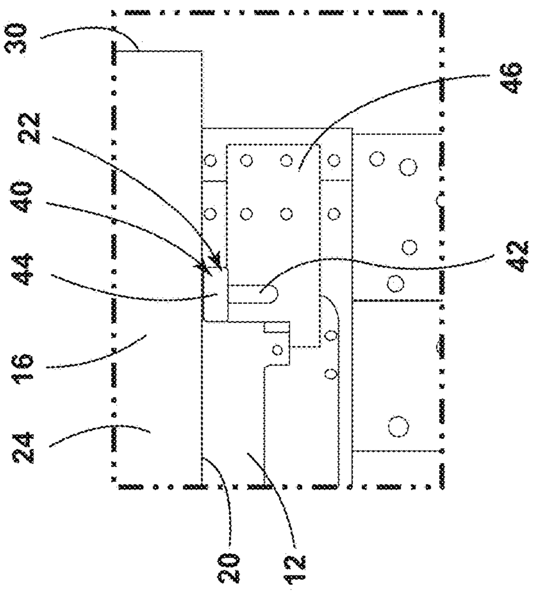
FIG. 3 is an enlarged view of portion III of FIG. 2 illustrating the door support feature in a first position.
Figure 4:
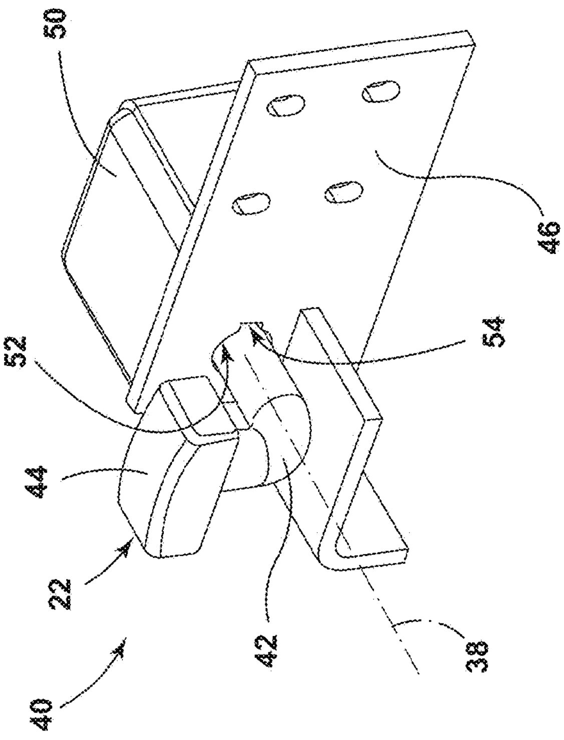
FIG. 4 is a top perspective view of a door support assembly illustrating a door support feature in a first position.
Figure 5:
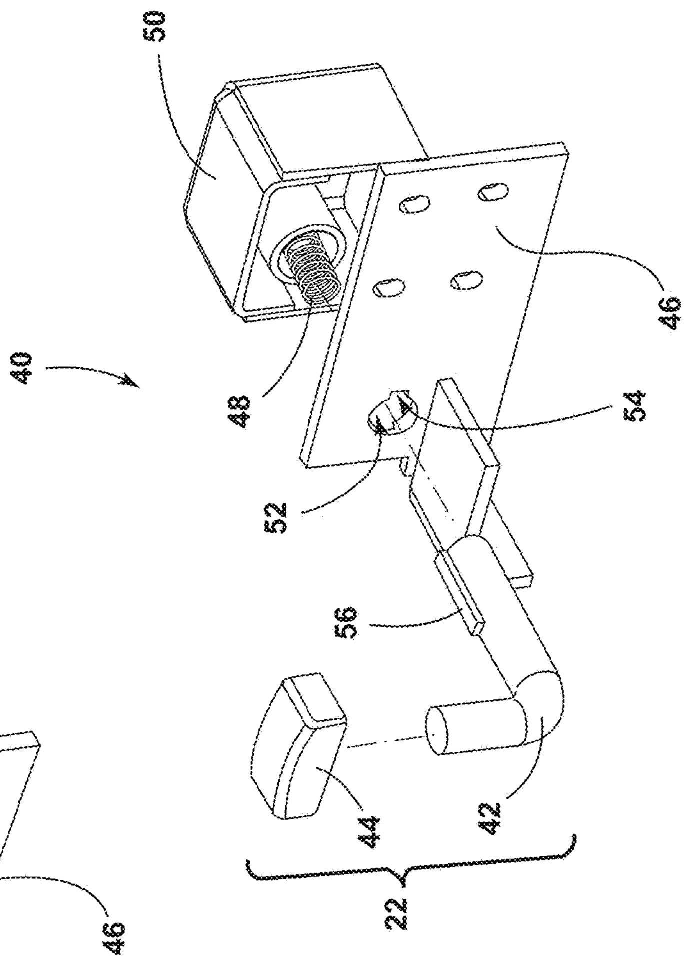
FIG. 5 is an exploded view of the door support assembly illustrated in FIG. 4.

Referring now to FIGS. 2-5, in various embodiments, the refrigeration unit 10 includes a door support assembly 40. In such embodiments, the one or more components that comprise the door support feature 22 may be included in the door support assembly 40. For example, in the embodiment illustrated in FIGS. 4 and 5, the door support assembly 40 includes the door support feature 22, which includes a pivot member 42, and a support pad 44 coupled to the pivot member 42. The door support assembly 40 further includes a bracket 46, a biasing feature 48, and a housing 50. The bracket 46 is configured to be mounted to the cabinet 12 of the refrigeration unit 10. The bracket 46 includes a receiving aperture 52 through which the pivot member 42 of the door support feature 22 is configured to extend. As illustrated in FIGS. 4 and 5, the receiving aperture 52 defined by the bracket 46 includes a key slot portion 54 that extends outward from the generally circular periphery of the remainder of the receiving aperture 52. As illustrated in FIG. 5, the pivot member 42 of the door support feature 22 includes a key feature 56 that is configured to selectively correspond with the key slot portion 54 of the receiving aperture 52, as described further herein. In the embodiment illustrated in FIGS. 4 and 5, the pivot member 42 of the door support feature 22 is generally L-shaped, and the support pad 44 is coupled to an end of the L-shaped pivot member 42. The housing 50 is coupled to the bracket 46, as illustrated in FIG. 4, and houses the biasing feature 48, which is illustrated as a compression spring in FIG. 5. The biasing feature 48 is configured to bias the door support feature 22, as described further herein.

In operation of an exemplary embodiment of the door support assembly 40 illustrated in FIGS. 4 and 5, initially, the housing 50 is coupled to the bracket 46, and the biasing feature 48 is disposed within the housing 50 and generally aligned with the receiving aperture 52 defined by the bracket 46. The door support feature 22, which includes the support pad 44 and the pivot member 42, is inserted into the receiving aperture 52 defined by the bracket 46. In particular, the key feature 56 of the pivot member 42 is aligned with the key slot portion 54 of the receiving aperture 52, and the door support feature 22 is then inserted into the receiving aperture 52 against the bias of the biasing feature 48 that contacts the pivot member 42 upon insertion. Once the pivot member 42 is inserted such that the key feature 56 clears the key slot portion 54 of the receiving aperture 52, the door support feature 22 is pivoted within the receiving aperture 52 to the first position, wherein the support pad 44 is positioned upward of the pivot member 42, as illustrated in FIG. 4. Positioned as such, the door support feature 22 is configured to support the lower side 20 of the door 16 in the closed position of the door 16, as illustrated in FIGS. 2 and 3.

Referring still to the embodiment illustrated in FIGS. 4 and 5, the door support feature 22 is operable to move from the first position to the second position, wherein the door support feature 22 is in a spaced-relationship with the lower side 20 of the door 16 in the closed position of the door 16, by pivoting within the receiving aperture 52 defined by the bracket 46. For example, in one implementation, the door support feature 22 can be pivoted 180° counterclockwise, such that the support pad 44 is positioned below the pivot member 42 of the door support feature 22 in the second position. Further, in some implementations, the door support feature 22 can be pivoted clockwise from the first position, such that the key feature 56 of the door support feature 22 is aligned with the key slot portion 54 of the receiving aperture 52, allowing the door support feature 22 to be wholly removed from the receiving aperture 52 to the second position. In various embodiments, when the door support feature 22 is positioned such that the key feature 56 is not aligned with the key slot portion 54 of the receiving aperture 52, the biasing feature 48 biases the door support feature 22 such that the key feature 56 forcibly contacts the bracket 46, which yieldingly maintains the position of the door support feature 22.

Referring now to FIGS. 6-8, an exemplary embodiment of the door support assembly 40 is illustrated. In the illustrated embodiment, the door support assembly 40 includes the bracket 46, which is coupled to the cabinet 12 of the refrigeration unit 10, and the door support feature 22. The door support feature 22 includes a first portion 58 that, in the first position of the door support feature 22, is configured to support the lower side 20 of the door 16 in the closed position of the door 16, as illustrated in FIGS. 6 and 7. The door support feature 22 further includes a second portion 60 that is coupled to the first portion 58 at a corner 62 and that, in the first position of the door support feature 22, is configured to extend upward along a portion of the front side 24 of the door 16 in the closed position of the door 16, as illustrated in FIGS. 6 and 7. The door support feature 22 further includes the pivot member 42, which extends downward from the first portion 58 of the door support feature 22. The pivot member 42 is operable to pivot relative to the bracket 46 about the door support feature-pivot axis 38. In various embodiments, the door support feature-pivot axis 38 is substantially parallel to the door pivot axis 34 about which the door 16 is operable to pivot between the open and closed positions. As illustrated in FIG. 6, the pivot member 42 of the door support feature 22 includes a retention feature 64 that engages with a portion of the bracket 46 of the door support assembly 40 in the first position of the door support feature 22. Engagement of the retention feature 64 with the bracket 46 is operable to selectively maintain the door support feature 22 in the first position. In various embodiments, the second portion 60 of the door support feature 22 is configured to limit movement of the door 16 toward the open position. In the embodiment illustrated in FIG. 7, the second portion 60 is positioned in a spaced-relationship with the front side 24 of the closed door 16 in the first position of the door support feature 22.

Referring now to FIGS. 1 and 2, the refrigeration unit 10 can include a toe kick panel 66. The toe kick panel 66 can be operable between an assembled condition and a removed condition. In the assembled condition, the toe kick panel 66 is assembled with the cabinet 12 and positioned below the door 16 of the refrigeration unit 10, such that the toe kick panel 66 conceals the door support feature 22, as illustrated in FIG. 1. In the removed condition, the toe kick panel 66 is removed from the cabinet 12, such that the door support feature 22 is revealed, as illustrated in FIG. 2. In various implementations, the toe kick panel 66 is configured to conceal the door support feature 22 in the first position of the door support feature 22 and the second position of the door support feature 22, in the assembled condition of the toe kick panel 66. It is contemplated that, in some implementations, the toe kick panel 66 may be configured to conceal the door support feature 22 in one of the first and second positions of the door support feature 22.

In some embodiments, the door support feature 22 is operable to remain in the second position irrespective of movement of the door 16 between the open and closed positions. In other words, movement of the door 16 between the open and closed positions does not cause the door support feature 22 to move out of the second position. Further, in various embodiments, the door support feature 22 can be operable to remain in the first position irrespective of movement of the door 16 between the open and closed positions.

In operation of an exemplary embodiment of the refrigeration unit 10, initially, the door 16 of the refrigeration unit 10 is in the closed position, and the door support feature 22 is in the second position in a spaced-relationship with the lower side 20 of the door 16. Prior to transportation of the refrigeration unit 10, a user moves the toe kick panel 66 from the assembled condition to the removed condition and pivots the door support feature 22 from the second position to the first position. In the first position of the door support feature 22, the door support feature 22 supports the lower side 20 of the door 16 at a position that is distal from the hinge 18 coupled to the door 16 proximate to the first lateral side 28 of the door 16. Further, the door support feature 22 limits movement of the door 16 toward the open position, while in the first position. After transporting the refrigeration unit 10 to the desired location, the user pivots the door support feature 22 from the first position to the second position, which allows the door 16 to move to the open position, and returns the toe kick panel 66 to the assembled condition.

The door support feature of the present disclosure may provide for a variety of advantages. First, the door support feature 22 supporting the lower side 20 of the door 16 at a position that is generally distal from the hinge 18 coupled to the door 16 may provide supplemental support to the door 16 that reduces the amount of stress incurred by the hinge 18 during transportation and/or installation of the refrigeration unit 10. Second, the door support feature 22 limiting movement of the door 16 toward the open position while the door support feature 22 is in the first position may generally prevent undesired opening of the door 16 of the refrigeration unit 10 during transportation of the refrigeration unit 10.

According to aspect of the present disclosure, a refrigeration unit includes a cabinet that defines a compartment and a door pivotably coupled to the cabinet by a hinge and having a lower side. The door is operable to pivot between an open position and a closed position. In the open position of the door, access to the compartment is provided. The refrigeration unit also includes a door support feature positioned proximate to the lower side of the door and movable relative to the cabinet between a first position and a second position. In the first position, the door support feature is configured to support the lower side of the door in the closed position of the door. In the second position, the door support feature is in a spaced-relationship with the lower side of the door in the closed position of the door. The refrigeration unit further includes a toe kick panel operable between an assembled condition and a removed condition. In the assembled condition, the toe kick panel is assembled with the cabinet below the door, such that the toe kick panel conceals the door support feature. In the removed condition, the toe kick panel is removed from the cabinet, such that the door support feature is revealed.

According to another aspect, in the assembled condition of the toe kick panel, the toe kick panel is configured to conceal the door support feature in the first position of the door support feature and the second position of the door support feature.

According to another aspect, the door support feature is configured to limit movement of the door toward the open position in the first position of the door support feature.

According to another aspect, the door support feature includes a first portion that, in the first position of the door support feature, is configured to support the lower side of the door in the closed position of the door, and a second portion that is coupled to the first portion at a corner and that, in the first position of the door support feature, is configured to extend upward along a portion of a front side of the door in the closed position of the door.

According to another aspect, the door support feature further includes a pivot member extending downward from the first portion and operable to pivot about a door support feature-pivot axis that is substantially parallel to a door pivot axis about which the door is operable to pivot between the open and closed positions.

According to another aspect, the door support feature is operable to pivot about a door support feature-pivot axis between the first position and the second position that is substantially perpendicular to a door pivot axis about which the door is operable to pivot between the open and closed positions.

According to another aspect, the door support feature is assembled with the cabinet in the first position and is removed from the cabinet in the second position.

According to another aspect of the present disclosure, a refrigeration unit includes a cabinet that defines a compartment and a door pivotably coupled to the cabinet by a hinge and having a lower side. The door is operable to pivot between an open position and a closed position. In the open position of the door, access to the compartment is provided. The refrigeration unit also includes a door support feature operably coupled to the cabinet and movable relative to the cabinet between a first position and a second position. In the first position, the door support feature is configured to support the lower side of the door in the closed position of the door and limit movement of the door toward the open position. In the second position, the door support feature is in a spaced-relationship with the lower side of the door in the closed position of the door and the door is operable to move to the open position.

According to another aspect, the door support feature includes a first portion that, in the first position of the door support feature, is configured to support the lower side of the door in the closed position of the door, and a second portion that is coupled to the first portion at a corner and that, in the first position of the door support feature, is configured to extend upward along a portion of a front side of the door in the closed position of the door.

According to another aspect, the door support feature further includes a pivot member extending downward from the first portion and operable to pivot about a door support feature-pivot axis that is substantially parallel to a door pivot axis about which the door is operable to pivot between the open and closed positions.

According to another aspect, in the first position of the door support feature, the second portion is configured to limit movement of the door toward the open position.

According to another aspect, the second portion is positioned in a spaced-relationship with the front side of the door in the first position of the door support feature and the closed position of the door.

According to another aspect, the door includes a first lateral side and a second lateral side opposite the first lateral side. The first lateral side is positioned nearer than the second lateral side to the hinge. Further, the second lateral side is positioned nearer than the first lateral side to the door support feature in the closed position of the door and the first position of the door support feature.

According to another aspect, a handle is coupled to a front side of the door. The second lateral side is positioned nearer than the first lateral side to the handle.

According to another aspect of the present disclosure, a refrigeration unit includes a cabinet that defines a compartment and a door pivotably coupled to the cabinet by a hinge and having a lower side. The door is operable to pivot between an open position and a closed position. In the open position of the door, access to the compartment is provided. The refrigeration unit also includes a door support feature positioned proximate to the lower side of the door and movable relative to the cabinet between a first position and a second position. In the first position, the door support feature is configured to support the lower side of the door in the closed position of the door. In the second position, the door support feature is in a spaced-relationship with the lower side of the door in the closed position of the door, and the door support feature is operable to remain in the second position irrespective of movement of the door between the open and closed positions.

According to another aspect, a toe kick panel is operable between an assembled condition and a removed condition. In the assembled condition, the toe kick panel is assembled with the cabinet below the door, such that the toe kick panel conceals the door support feature. In the removed condition, the toe kick panel is removed from the cabinet, such that the door support feature is revealed.

According to another aspect, in the assembled condition of the toe kick panel, the toe kick panel is configured to conceal the door support feature in the first position of the door support feature and the second position of the door support feature.

According to another aspect, the door support feature is configured to limit movement of the door toward the open position in the first position of the door support feature.

According to another aspect, the door includes a first lateral side, and a second lateral side opposite the first lateral side. The first lateral side is positioned nearer than the second lateral side to the hinge. Further, the second lateral side is positioned nearer than the first lateral side to the door support feature in the closed position of the door and the first position of the door support feature.

According to yet another aspect, a handle is coupled to a front side of the door. The second lateral side is positioned nearer than the first lateral side to the handle.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

What is claimed is:

1. A refrigeration unit, comprising:

a cabinet that defines a compartment;

a door pivotably coupled to the cabinet by a hinge and having a lower side, the door being operable to pivot between an open position, wherein access to the compartment is provided, and a closed position;

a door support feature positioned proximate to the lower side of the door and movable relative to the cabinet between a first position, wherein the door support feature is configured to support the lower side of the door and is configured to limit movement of the door toward the open position in the closed position of the door, and a second position, wherein the door support feature is in a spaced-relationship with the lower side of the door in the closed position of the door, the door support feature comprising:

a first portion that, in the first position of the door support feature, is configured to support the lower side of the door in the closed position of the door;

a second portion that is coupled to the first portion at a corner and that, in the first position of the door support feature, is configured to extend upward along a portion of a front side of the door in the closed position of the door; and a pivot member extending downward from the first portion and operable to pivot about a door support feature-pivot axis that is substantially parallel to a door pivot axis about which the door is operable to pivot between the open and closed positions; and a toe kick panel operable between an assembled condition, wherein the toe kick panel is assembled with the cabinet below the door, such that the toe kick panel conceals the door support feature, and a removed condition, wherein the toe kick panel is removed from the cabinet, such that the door support feature is revealed.

2. The refrigeration unit of claim 1, wherein, in the assembled condition of the toe kick panel, the toe kick panel is configured to conceal the door support feature in the first position of the door support feature and the second position of the door support feature.

3. The refrigeration unit of claim 1, wherein the door support feature is assembled with the cabinet in the first position and is removed from the cabinet in the second position.

4. A refrigeration unit, comprising:

a cabinet that defines a compartment;

a door pivotably coupled to the cabinet by a hinge and having a lower side, the door being operable to pivot between an open position, wherein access to the compartment is provided, and a closed position; and a door support feature operably coupled to the cabinet and movable relative to the cabinet between a first position, wherein the door support feature is configured to support the lower side of the door in the closed position of the door and limit movement of the door toward the open position, and a second position, wherein the door support feature is in a spaced-relationship with the lower side of the door in the closed position of the door and the door is operable to move to the open position.

5. The refrigeration unit of claim 4, wherein the door support feature comprises:

a first portion that, in the first position of the door support feature, is configured to support the lower side of the door in the closed position of the door; and a second portion that is coupled to the first portion at a corner and that, in the first position of the door support feature, is configured to extend upward along a portion of a front side of the door in the closed position of the door.

6. The refrigeration unit of claim 5, wherein the door support feature further comprises:

a pivot member extending downward from the first portion and operable to pivot about a door support feature-pivot axis that is substantially parallel to a door pivot axis about which the door is operable to pivot between the open and closed positions.

7. The refrigeration unit of claim 5, wherein, in the first position of the door support feature, the second portion is configured to limit movement of the door toward the open position.

8. The refrigeration unit of claim 7, wherein the second portion is positioned in a spaced-relationship with the front side of the door in the first position of the door support feature and the closed position of the door.

9. The refrigeration unit of claim 4, wherein the door comprises:

a first lateral side; and a second lateral side opposite the first lateral side, wherein the first lateral side is positioned nearer than the second lateral side to the hinge, and the second lateral side is positioned nearer than the first lateral side to the door support feature in the closed position of the door and the first position of the door support feature.

10. The refrigeration unit of claim 9, further comprising:

a handle coupled to a front side of the door, wherein the second lateral side is positioned nearer than the first lateral side to the handle.

11. A refrigeration unit, comprising:

a cabinet that defines a compartment;

a door pivotably coupled to the cabinet by a hinge and having a lower side, the door being operable to pivot between an open position, wherein access to the compartment is provided, and a closed position; and a door support feature positioned proximate to the lower side of the door and movable relative to the cabinet between a first position, wherein the door support feature is configured to support the lower side of the door in the closed position of the door, and a second position, wherein the door support feature is in a spaced-relationship with the lower side of the door in the closed position of the door, and wherein the door support feature is operable to remain in the second position irrespective of movement of the door between the open and closed positions.

12. The refrigeration unit of claim 11, further comprising:

a toe kick panel operable between an assembled condition, wherein the toe kick panel is assembled with the cabinet below the door, such that the toe kick panel conceals the door support feature, and a removed condition, wherein the toe kick panel is removed from the cabinet, such that the door support feature is revealed.

13. The refrigeration unit of claim 12, wherein, in the assembled condition of the toe kick panel, the toe kick panel is configured to conceal the door support feature in the first position of the door support feature and the second position of the door support feature.

14. The refrigeration unit of claim 11, wherein the door support feature is configured to limit movement of the door toward the open position in the first position of the door support feature.

15. The refrigeration unit of claim 11, wherein the door comprises:

a first lateral side; and a second lateral side opposite the first lateral side, wherein the first lateral side is positioned nearer than the second lateral side to the hinge, and the second lateral side is positioned nearer than the first lateral side to the door support feature in the closed position of the door and the first position of the door support feature.

16. The refrigeration unit of claim 15, further comprising:

a handle coupled to a front side of the door, wherein the second lateral side is positioned nearer than the first lateral side to the handle.

* * * * *